United States Patent [19]
Schubert et al.

[11] Patent Number: 5,958,033
[45] Date of Patent: Sep. 28, 1999

[54] ON- THE-FLY PARTITIONABLE COMPUTER BUS FOR ENHANCED OPERATION WITH VARYING BUS CLOCK FREQUENCIES

[75] Inventors: Michael Schubert; Samuel M. Babb; Greg A. Degi, all of Fort Collins, Colo.

[73] Assignee: Hewlett Packard Company, Palo Alto, Calif.

[21] Appl. No.: 08/910,278

[22] Filed: Aug. 13, 1997

[51] Int. Cl.[6] .............................. G06F 13/00; G06F 13/40; H04Q 3/52
[52] U.S. Cl. ............................................. 710/126; 710/131
[58] Field of Search ..................................... 395/306, 309, 395/311, 858, 312, 828, 853; 370/364

[56] References Cited

U.S. PATENT DOCUMENTS

| | | | |
|---|---|---|---|
| 4,535,448 | 8/1985 | Baxter et al. ............................. | 370/364 |
| 4,922,409 | 5/1990 | Schoellkopf et al. .................. | 395/307 |
| 5,487,155 | 1/1996 | Drewry et al. .......................... | 395/311 |
| 5,491,814 | 2/1996 | Yee et al. ................................. | 395/550 |
| 5,572,685 | 11/1996 | Fisher et al. ............................. | 395/287 |
| 5,751,976 | 5/1998 | Okazawa et al. ........................ | 395/306 |
| 5,802,355 | 9/1998 | Arroyo et al. ........................... | 395/553 |

Primary Examiner—Gopal C. Ray
Attorney, Agent, or Firm—Kevin M. Hart

[57] ABSTRACT

Method and apparatus for controlling a computer bus having first and second bus slots and operable with a bus controller at first and second data transfer rates. When the computer bus is operating at the first data transfer rate, the bus is partitioned so that the address/data pins of the bus controller are coupled to the address/data pins of both of the first and second bus slots, and the control pins of the bus controller are coupled only to the control pins of the second bus slot. When the computer bus is operating at the second data transfer rate, the bus is partitioned so that the address/data pins of the bus controller are coupled only to the address/data pins of the first bus slot, and the control pins of the bus controller are coupled only to the control pins of the first bus slot. The second data transfer rate may be faster than the first data transfer rate.

17 Claims, 4 Drawing Sheets

# ON-THE-FLY PARTITIONABLE COMPUTER BUS FOR ENHANCED OPERATION WITH VARYING BUS CLOCK FREQUENCIES

FIELD OF THE INVENTION

This invention relates generally to computer bus architectures, and more particularly to computer bus architectures designed for operation at more than one bus clock frequency.

BACKGROUND

In general, a computer bus is used to interface various devices or subsystems with other subsystems in a computer system. For example, a computer input/output bus may be used to interface input/output devices such as a modem, printer or graphics system to the CPU via an input/output bus controller. One problem that has confronted designers of such input/output buses in the past has been that, as technology develops, it is desirable to specify faster and faster bus clock frequencies for the bus in order to achieve maximum bandwidth during data transfers to and from the input/output devices coupled to it. On the other hand, not all input/output devices coupled to a particular bus may be capable of operating at the maximum specified bus clock frequency. Therefore, some bus architectures have been designed to accommodate input/output devices having a variety of maximum date transfer speeds. Two such bus architectures are disclosed in U.S. Pat. No. 5,491,814, titled "Apparatus Using a State Machine for Generating Selectable Clock Frequencies and a Fixed Frequency for Operating a Computer Bus," issued to Yee, et al. and assigned to Intel Corporation (hereinafter "Yee '814"). The two bus architectures disclosed in Yee '814 are reproduced herein at FIGS. 1 and 2.

Referring to FIG. 1, Yee '814 discloses using two separate buses 109 and 111 for slow and fast peripheral devices, respectively. Slow peripheral devices are coupled only to bus 109, and fast peripheral devices are coupled only to bus 111. Each of the two buses 109, 111 has its own bus controller 105, 107, and each bus controller 105, 107 has its own bus controller clock 106, 108. One of the bus controller clocks is fast (108), and one is slow (106). Both bus controllers 105, 107 are coupled to the processor or DMA controller 100. The system of FIG. 1 would be configured so that each of the two bus controllers decodes for a different range of addresses.

Referring now to FIG. 2, Yee '814 also teaches using a single bus 203 in lieu of the two buses 109, 111 shown in FIG. 1. In the system of FIG. 2, only one bus controller 200 is coupled to the single bus 203, but the single bus controller 200 is capable of operating at two different bus clock frequencies. The two different bus clock frequencies are produced by a dynamic bus clock generator 201 responsive to the output of a decode block 202. Both the bus controller 200 and the decode block 202 are coupled to processor or DMA controller 100. Fast and slow peripherals are associated with different address ranges, and decode block 202 monitors the target addresses for all bus cycles that are originated by processor or DMA controller 100. In turn, decode block 202 sends a decode output signal to bus clock generator 201. The result is that bus clock generator 201 clocks bus controller 200 either fast or slow depending on whether the target address for the bus cycle corresponds to a fast or slow peripheral. Yee '814 also teaches using signal screening logic 240 to either tri-state or force high or low certain of the signal lines comprising single bus 203 when the bus is operating at the faster of the two bus clock frequencies.

The bus architectures shown in FIGS. 1 and 2 are useful to the extent that they enable peripherals with different maximum speeds to be used together in a computer system more efficiently than in the past. However, several problems remain that the architectures of FIGS. 1 and 2 neither address nor solve:

First, it has been observed that when data transfers occur at fast bus clock frequencies such as 66 MHZ or greater, no more than two or three bus slots may be populated with peripherals. This is so because of the cumulative loading effect caused by parallel-connected peripherals.

Second, for multi-speed buses, the architecture of FIG. 2 has limited usefulness because the bus clock frequency is determined by the target address of each bus cycle. This scheme only works if processor or DMA controller 100 originates all of the bus cycles. (Decode block 202 is only able to decode signals generated by processor or DMA controller 100.) In modern systems, however, processor or DMA controller 100 would not be the only subsystem initiating bus cycles. Rather, it is now commonly the case that each of the peripherals occupying bus slots may from time to time initiate bus cycles. Even if the architecture of FIG. 2 were modified so that decode block 202 could see addresses generated by systems other than processor or DMA controller 100, the scheme of setting the bus speed based solely on the target address of the bus cycle would be inadequate to address the needs of such a modern system. For example, if a slow peripheral initiated a bus cycle to read data from a faster subsystem, the data transfer must occur at the slow speed of the originating peripheral. An architecture based on the teaching of Yee '814, however, would set the bus speed based on the target address and would therefore attempt to execute the bus cycle at the speed of the faster subsystem. The result would be a bus clock speed incompatible with the capabilities of the slower peripheral initiating the bus cycle.

A third problem involves the teaching by Yee '814 of the use of signal screening logic 240 during fast bus cycles. This mechanism would fail in modern systems for several reasons. First, all control signals must remain available to whichever peripheral is involved in a bus transaction. This cannot be achieved if a control signal on single bus 203 is simply tri-stated or forced high or low. Second, in modern systems wherein fast peripherals sample bus control signals at twice the rate of slow peripherals, it may happen that, during slow cycles, the fast peripherals may sample a control signal when the signal is indeterminate. Therefore, it becomes desirable to isolate fast peripherals from the control bus entirely during slow cycles, but to keep the slow peripherals coupled to the control bus during those cycles. This result is impossible to achieve with the signal screening logic 240 and single bus 203 taught by Yee '814. Moreover, Yee '814 only teaches the use of signal screening logic 240 during fast cycles, not slow ones.

SUMMARY OF THE INVENTION

In an embodiment, the invention includes a partitionable computer bus. The partitionable computer bus includes a bus controller, a set of bus partitioning switches, and first and second bus slots. A first bus section couples the bus controller to the first bus slot and to left terminals of the set of bus partitioning switches. A second bus section couples right terminals of the set of bus partitioning switches to the second bus slot. The partitionable computer bus is operable at a slower and a faster data transfer rate. Circuitry for generating an open/close signal is operable to open the set of bus partitioning switches when the computer bus is operating at the faster data transfer rate, and to close the set of bus partitioning switches when the computer bus is operating at the slower data transfer rate. The circuitry for generating the open/close signal may be responsive to bus arbitration signals, and the bus partitioning switches may be formed using a set of field-effect transistors, each having its gate coupled to the open/close signal.

In a further embodiment, a partitionable computer bus according to the invention may include a bus controller having address/data signal nodes and control signal nodes; first and second bus slots, each having address/data signal nodes and control signal nodes; a set of address/data signal partitioning switches; and first and second sets of control signal partitioning switches. The sets of partitioning switches each have a partitioning input for opening and closing the switches. The address/data signal nodes of the bus controller are coupled to the address/data signal nodes of the first bus slot and to the left terminals of the set of address/data signal partitioning switches. The right terminals of the set of address/data signal partitioning switches are coupled to the address/data signal nodes of the second bus slot. The control signal nodes of the bus controller are coupled to the left terminals of both of the first and second sets of control signal partitioning switches. The right terminals of the first set of control signal partitioning switches are coupled to the control signal nodes of the first bus slot. The right terminals of the second set of control signal partitioning switches are coupled to the control signal nodes of the second bus slot. The first and second bus slots are operable to interface with first and second peripheral systems, respectively, the first peripheral system being capable of a faster data transfer rate than the second peripheral system. Circuitry is provided for generating an open/close signal. The open/close signal is coupled to the partition inputs of the address/data signal partitioning switches and to the partition inputs of the second set of control signal partitioning switches, but the inverse of the open/close signal is coupled to the partition input of the first set of control signal partitioning switches. The circuitry for generating an open/close signal is operable to place the open/close signal in a first state when bus traffic involves the first peripheral system, and to place the open/close signal in a second state when bus traffic involves the second peripheral system. In the first state, the switches in the set of address/data signal partitioning switches and in the second set of control signal positioning switches are open, and the switches in the first set of control signal partitioning switches are closed. In the second state, the switches in the set of address/data signal partitioning switches and in the second set of control signal positioning switches are closed, and the switches in the first set of control signal partitioning switches are open. The circuitry for generating an open/close signal may be responsive to bus arbitration signals.

In yet another embodiment, the invention includes a method of controlling a computer bus having first and second bus slots and operable with a bus controller at first and second data transfer rates. The method includes the following steps: When the computer bus is operating at the first data transfer rate, partitioning the computer bus so that the address/data pins of the bus controller are coupled to the address/data pins of both of the first and second bus slots, but so that the control pins of the bus controller are coupled only to the control pins of the second bus slot. When the computer bus is operating at the second data transfer rate, partitioning the computer bus so that the address/data pins of the bus controller are coupled only to the address/data pins of the first bus slot, and so that the control pins of the bus controller are coupled only to the control pins of the first bus slot. The second data transfer rate may be faster than the first data transfer rate. The steps may be carried out by opening and closing FET switches interposed in the bus lines at specified places. The method may also include the step of determining whether the next bus cycle will be performed at a first or second data transfer rate. This step may, in turn, be performed responsive to bus arbitration signals.

DETAILED DESCRIPTION OF THE PREFERRED EMBODIMENTS

Figure 1:
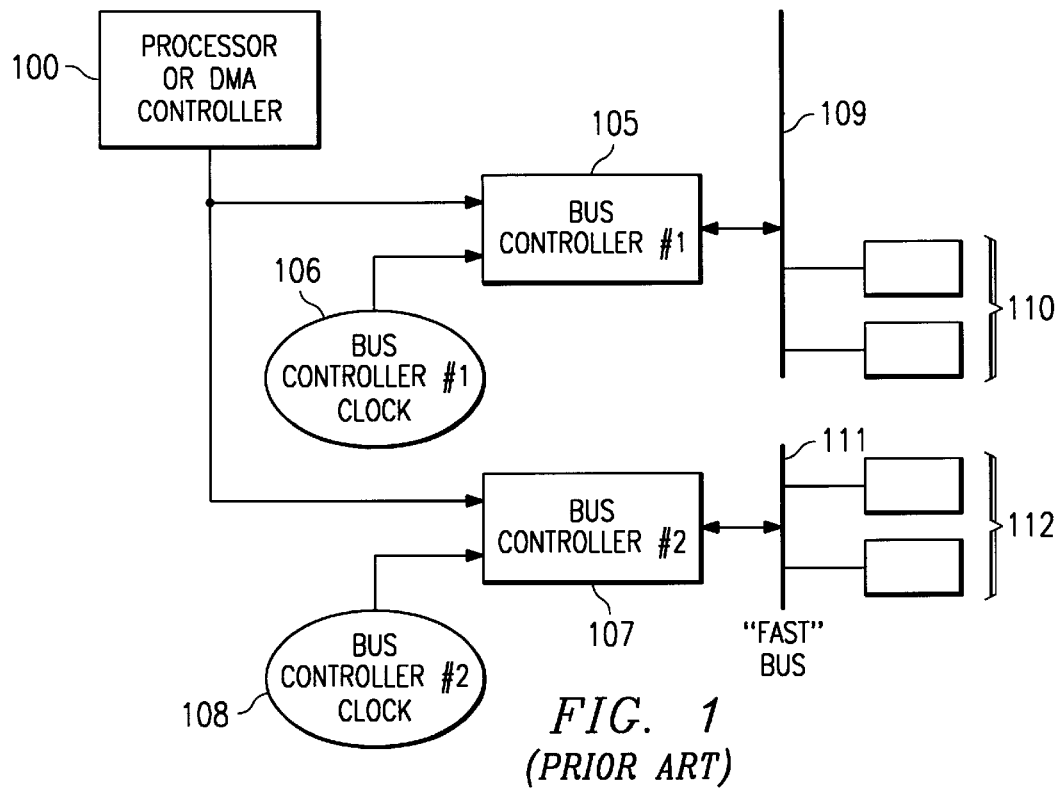
FIG. 1 is a block diagram illustrating a first prior art computer bus architecture.
Figure 2:
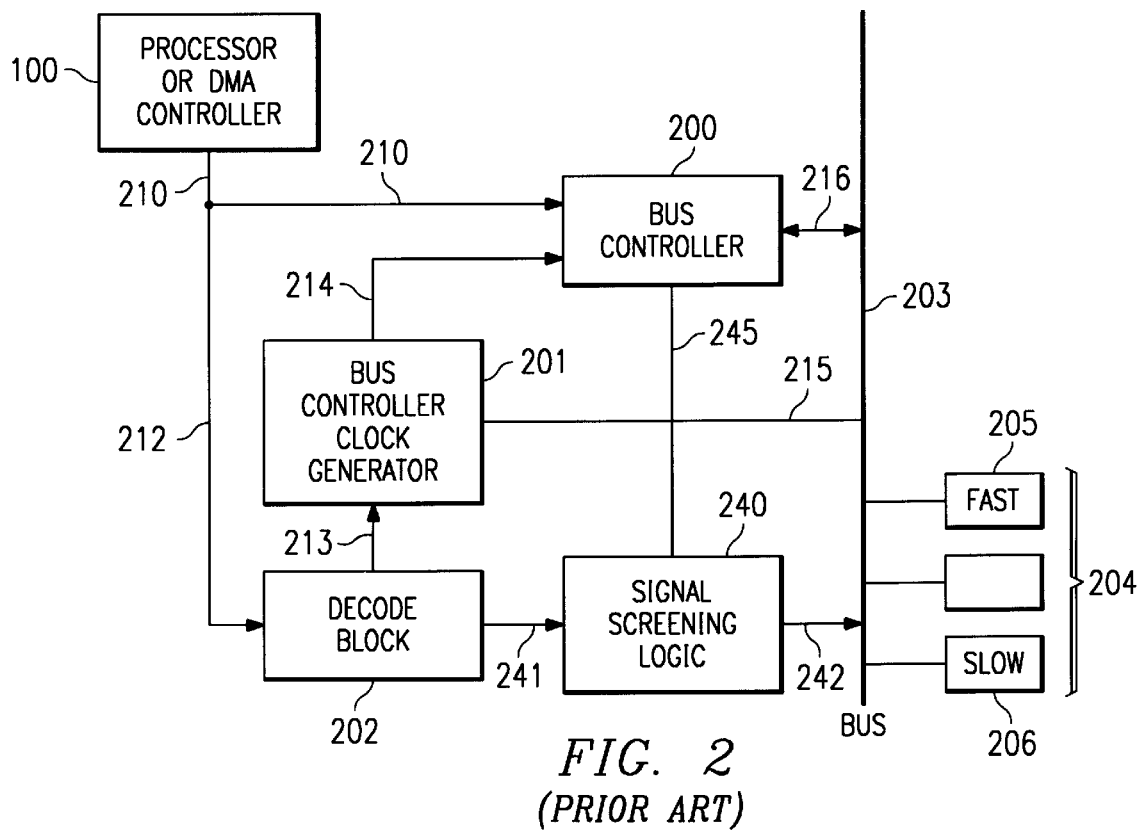
FIG. 2 is a block diagram illustrating a second prior art computer bus architecture.
Figure 3:
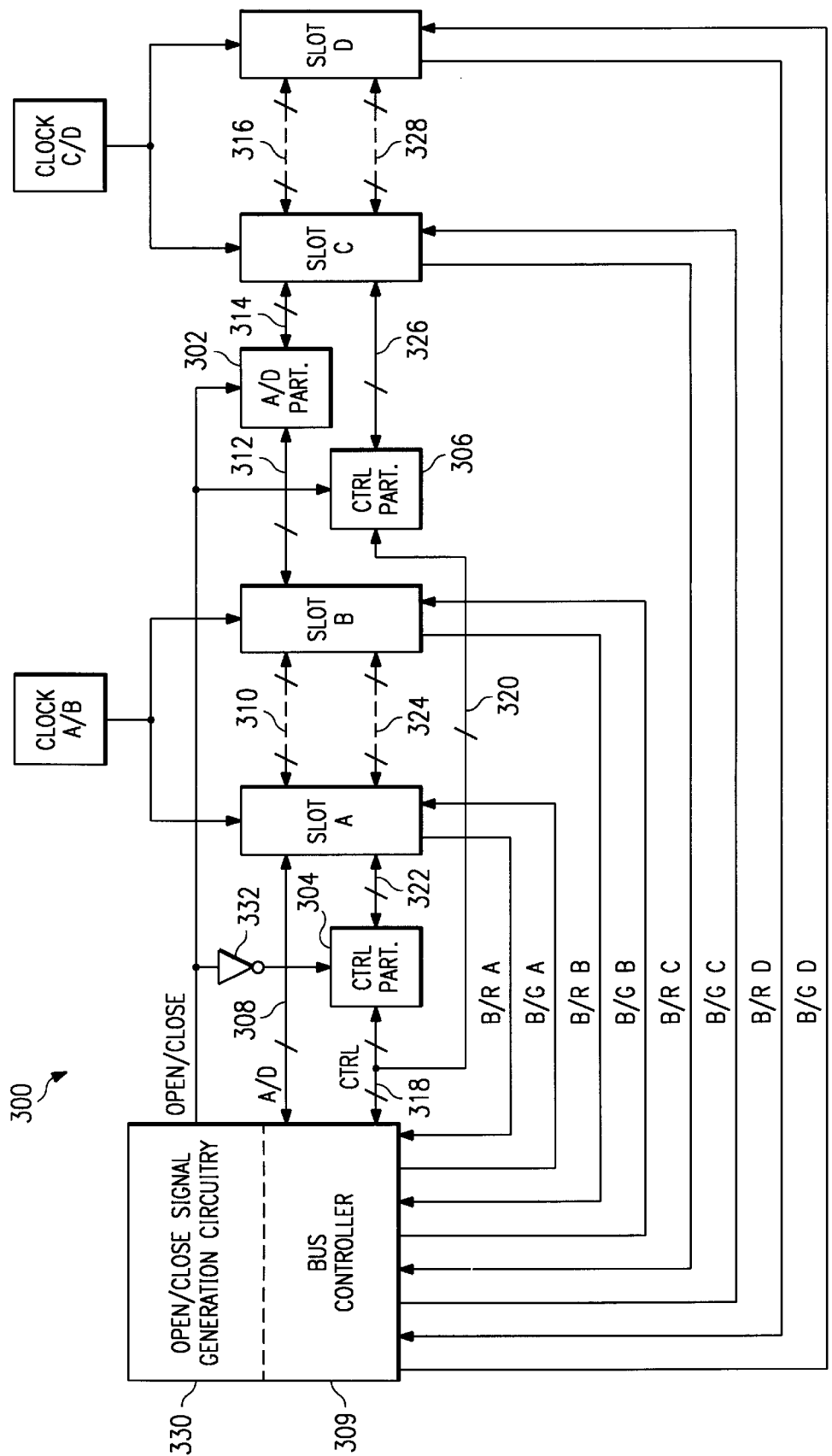
FIG. 3 is a block diagram illustrating a computer bus architecture according to a preferred embodiment of the invention.

FIG. 3 is a block diagram illustrating a partitionable bus architecture 300 according to a preferred embodiment of the invention. Four bus slots, A, B, C and D are shown in the drawing. Each bus slot is basically a group of nodes that may be electrically connected to a bus socket for engaging a peripheral such as a modem or other device. Each slot includes address/data signal nodes and control signal nodes as dictated by whichever bus standard is chosen for the implementation, such as the popular PCI standard. Although only four bus slots are shown in the drawing, implementations may contain more than four or fewer than four slots.

Figure 4:
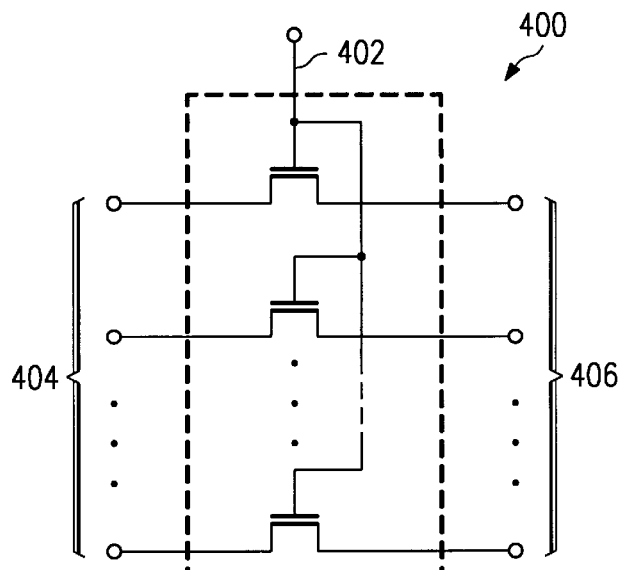
FIG. 4 is a schematic diagram illustrating a representative one of the sets of bus partitioning switches shown in FIG. 3.

The bus architecture of FIG. 3 also includes a set of address/data signal partitioning switches 302 and two sets of control signal partitioning switches 304 and 306. Any means may be employed to implement these signal partitioning switches, but such means should be capable of making and breaking connections between left and right terminals responsive to an open/close signal. FIG. 4 illustrates a preferred set of signal partitioning switches 400. As can be seen in the drawing, signal partitioning switches 400 may be made from a group of field effect transistors (FETs), each having its gate coupled to a common signal partition input 402. The drains and sources of the FETs are coupled to a set of left terminals 404 and a set of right terminals 406. In the configuration shown, the FETs are operable to make and break connections between the left and right terminals 404, 406 responsive to an open/close signal applied to the common signal partition input 402.

Address/data lines 308 are coupled between the address/data pins of bus controller 309 and the address/data nodes of bus slot A. Address/data lines 310 are coupled between the address/data nodes of bus slots A and B. Address/data lines 312 are coupled between the address/data nodes of bus slot B and the left terminals of address/data signal partitioning switches 302. Address/data lines 314 are coupled between the right terminals of address/data signal partitioning switches 302 and the address/data nodes of bus slot C.

Address/data lines 316 are coupled between the address/data nodes of bus slots C and D. Electrically, address/data lines 308, 310 and 312 form one bus section, coupling the address/data pins of bus controller 309 to the address/data nodes of both bus slots A and B and to the left terminals of address/data signal partitioning switches 302. Address/data lines 314 and 316 form a different bus section, coupling the right terminals of address/data signal partitioning switches 302 to the address/data nodes of both bus slots C and D.

Similarly, control signal lines 318 and 320 form one bus section coupling the control signal pins of bus controller 309 to the left terminals of control signal partitioning switches 304 and 306. Control signal lines 322 and 324 form a different bus section, coupling the right terminals of control signal partitioning switches 304 to the control nodes of both bus slots A and B. Control signal lines 326 and 328 form yet another bus section, coupling the right terminals of control signal partitioning switches 306 to the control nodes of both of bus slots C and D. Preferably, bus keepers (pull-up or pull-down) resistors should be placed on control lines 322, 324 and on control lines 326, 328. This is to ensure that, when the associated control signal partitioning switches are open, those sections of the control bus that are partitioned off from bus controller 309 are not left in an indeterminate or inappropriate state.

Open/close signal generation circuitry 330 generates an open/close signal that is coupled directly to the signal partition inputs of address/data signal partitioning switches 302 and control signal partitioning switches 306. The open/close signal is coupled to the signal partition input of control signal partitioning switches 304 via inverter 332. Open/close signal generation circuitry 330 may be formed either separately or in the same integrated circuit package as bus controller 309. Additionally, it is contemplated that one or both of open/close signal generation circuitry 330 and bus controller 309 may be formed within the same integrated circuit package as other components, such as a microprocessor, DMA controller or peripheral subsystem. The functionality of open/close signal generation circuitry 330 will be described in more detail below in relation to FIGS. 5 and 6. Bus controller 309 may be any bus controller capable of operating at two different bus clock frequencies.

Preferably, fast peripherals (such as those capable of data transfers at 66 MHZ) should occupy bus slots A and B, while slow peripherals (such as those capable of data transfers at 33 MHZ) should occupy bus slots C and D. In such an implementation, clock source A/B would provide a fixed 66 MHZ clock, while clock source C/D would provide a fixed 33 MHZ clock. These clocks may be derived from a master clock signal (not shown) used to clock bus controller 309. Whether or not clocks A/B and C/D are derived from the same master clock, they should be synchronized with the clock used to clock bus controller 309 to prevent glitching. As is indicated in the drawing, clock source A/B is coupled to appropriate nodes of bus slots A and B according to whichever bus standard is chosen. Likewise, clock source C/D is coupled to appropriate nodes of bus slots C and D.

In a preferred embodiment, and depending on the bus standard chosen, each of the bus slots will have a pair of bus arbitration signals designated in the drawing as "B/R" (bus request) and "B/G" (bus grant). These signals are coupled to bus controller 309 and are used by bus controller 309 in a conventional manner to arbitrate bus accesses requested by peripherals occupying the bus slots.

Figure 5:
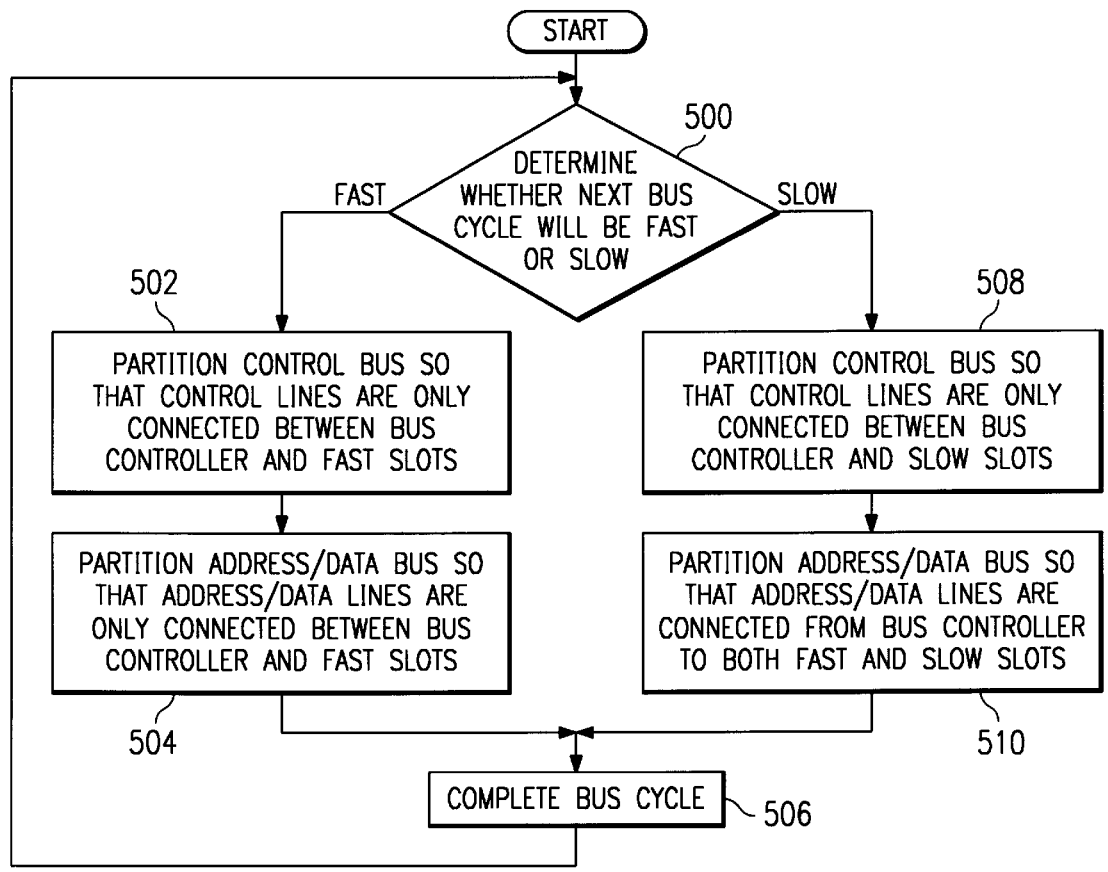
FIG. 5 is a flow diagram illustrating a method of controlling a computer bus according to a preferred embodiment of the invention.
Figure 6:
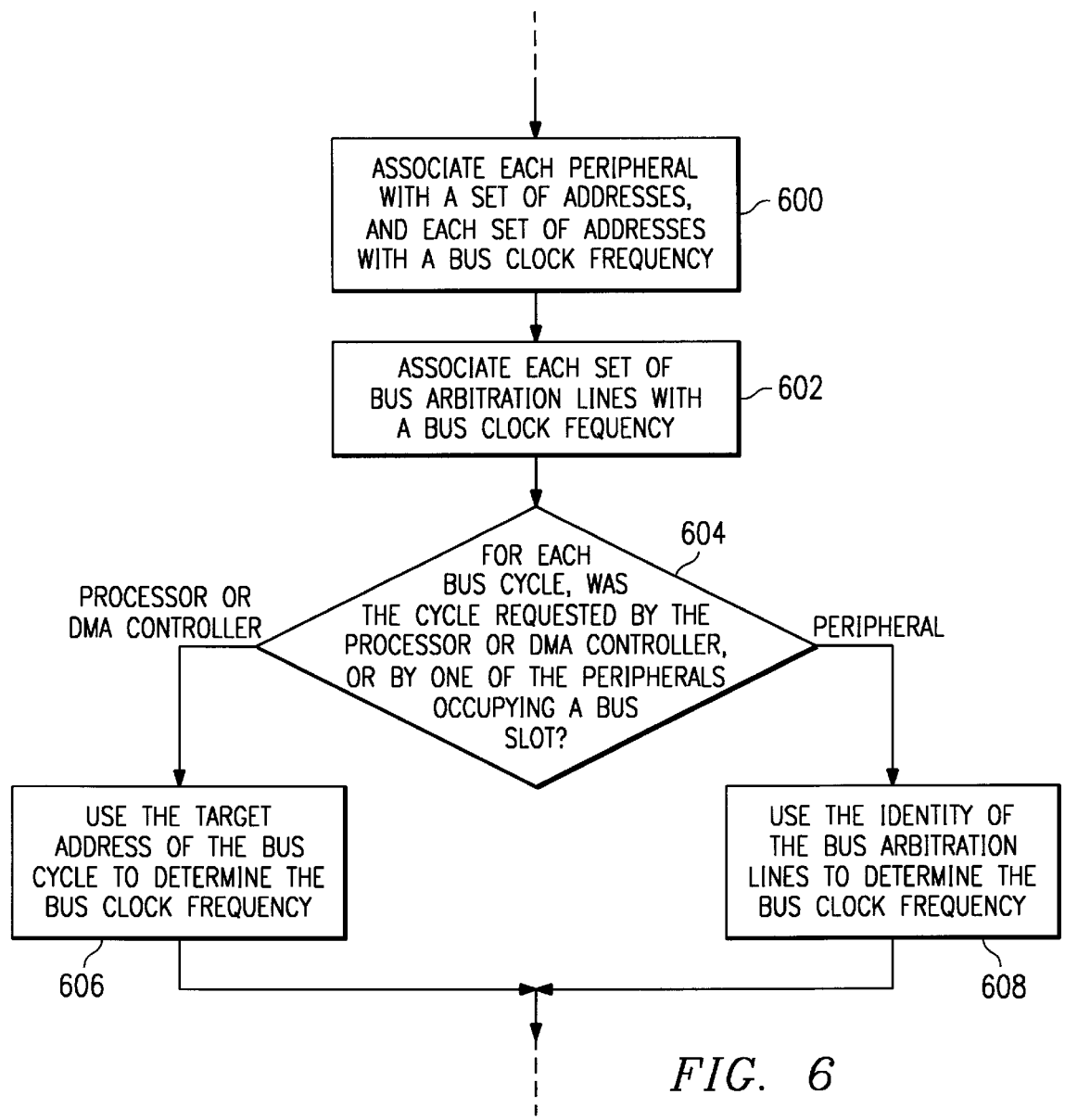
FIG. 6 is a flow diagram illustrating part of the flow diagram of FIG. 5 in more detail.

The operation of the bus architecture of FIG. 3 will now be discussed with reference to FIGS. 5 and 6. In step 500, each time a bus cycle is requested, a determination is made whether the cycle should be executed at a fast bus clock frequency (for example, 66 MHZ) or at a slow bus clock frequency (for example, 33 MHZ). FIG. 6 indicates in more detail how this step is preferably accomplished. In step 600, each peripheral occupying a bus slot is associated with an address or range of addresses. Fast peripherals occupying slots A or B would be associated with one set of addresses, and slow peripherals occupying slots C and D would be associated with a different set of addresses. Then, in step 602, each set of bus arbitration lines (one set for each bus slot) is associated with a speed corresponding to the peripheral that occupies the slot. Preferably, bus slots A and B will be associated with a fast speed, and bus slots C and D will be associated with a slow speed. In step 604, whenever a bus cycle is requested, it is determined whether the bus cycle was requested by the processor or DMA controller or by one of the peripherals occupying one of the bus slots. If the processor or DMA controller requested the bus cycle, then in step 606 the speed to be used for the cycle is determined based on the target address of the bus cycle. On the other hand, if the bus cycle was requested by one of the peripherals occupying a bus slot, then in step 608 the speed to be used for the cycle is determined based on the identity of the bus arbitration signals that were associated with the bus cycle. For example, suppose the peripheral in slot A asserted B/R A, thereby requesting a bus cycle. If bus controller 309 asserts B/G A, thereby granting the bus to the peripheral in slot A, then the same assertion of B/G A may also be used to indicate that the bus cycle requested should occur at the faster of the two bus clock frequencies, since B/R A and B/G A were previously associated with the fast frequency in step 602.

Referring once again to FIG. 5, once the determination is made whether the next bus cycle will occur at the fast or slow clock frequency, execution will continue along one of two paths. If the cycle is to be a fast one, then in step 502 the control bus is partitioned so that the control signal pins of bus controller 309 are coupled only to fast slots A and B. In step 504, the address/data bus is partitioned so that the address/data signal pins of bus controller 309 are coupled only to fast slots A and B. This partitioning is accomplished by an assertion of the open/close signal by open/close signal generation circuitry 330, causing partitioning switches 304 to close, and causing partitioning switches 302 and 306 to open. Then, in step 506, the bus cycle is completed at the fast frequency, and execution continues at step 500.

If it is determined in step 500 that the next bus cycle is to be a slow one, then in step 508 the control bus is partitioned so that the control signal pins of bus controller 309 are coupled only to slow slots C and D. In step 510, the address/data bus is partitioned so that the address/data signal pins of bus controller 309 are coupled to all slots, A, B, C and D. This partitioning is accomplished by a deassertion of the open/close signal by open/close signal generation circuitry 330, causing partitioning switches 304 to open, and causing partitioning switches 302 and 306 to close. Then, in step 506, the bus cycle is completed at the slow frequency, and execution continues at step 500. It is believed that, given this procedural description, the implementation of open/close signal generation circuitry 330 may be accomplished using conventional digital design techniques.

The benefits and advantages of the invention are numerous. For example, the ability to partition the bus on the fly alleviates the cumulative loading effect of having numerous peripherals occupying bus slots. (When the bus is operating at the faster frequency, only a subset of the peripherals are loading the bus because the slow peripherals are partitioned off of the bus.) The ability to partition the bus in this manner also enables the physical length of the bus to be made much shorter for fast bus cycles than for slow bus cycles, further enhancing bus operation at fast frequencies by decreasing signal propagation times. In addition, the ability to select the bus speed, and thus the active partitions, based on bus arbitration signals (instead of solely on the target address for a bus cycle) provides the ability to use the multi-speed bus of the invention in modern systems wherein bus cycles may be initiated by any of the peripherals occupying bus slots. Moreover, the ability to partition fast peripherals completely away from the control bus during slow cycles, while keeping slow peripherals coupled to the control bus, eliminates the possibility of fast peripherals sampling erroneous control information but allows slow peripherals to use the control lines. Other benefits and advantages will be apparent to those having ordinary skill in the art.

While the invention has been described in detail in relation to a particular embodiment thereof, this description is intended to be illustrative only. It will be obvious to those skilled in the art that many modifications can be made to the described embodiment without departing from the spirit and scope of the invention, and that such modifications will remain within the scope of the following claims.

What is claimed is:

1. A partitionable computer bus, comprising:

a bus controller;

a set of bus partitioning switches, each operable to make and break connections between left and right terminals responsive to an open/close signal;

circuitry for generating said open/close signal;

first and second bus slots;

a first bus section coupling said bus controller to said first bus slot and to the left terminals of said set of bus partitioning switches; and a second bus section coupling the right terminals of said set of bus partitioning switches to said second bus slot;

wherein the computer bus is operable at first and second data transfer rates, said first data transfer rate faster than said second data transfer rate; and wherein said circuitry for generating said open/close signal is operable to open said set of bus partitioning switches when the computer bus is operating at said first data transfer rate, and to close said set of bus partitioning switches when the computer bus is operating at said second data transfer rate.

2. The partitionable computer bus of claim 1, wherein said set of bus partitioning switches comprises field-effect transistors, each having its gate coupled to said open/close signal.

3. A partitionable computer bus, comprising:

a bus controller;

a set of bus partitioning switches, each operable to make and break connections between left and right terminals responsive to an open/close signal;

circuitry for generating said open/close signal;

first and second bus slots;

a first bus section coupling said bus controller to said first bus slot and to the left terminals of said set of bus partitioning switches; and a second bus section coupling the right terminals of said set of bus partitioning switches to said second bus slot;

wherein said circuitry for generating said open/close signal is operable to open and close said set of bus partitioning switches responsive to bus arbitration signals.

4. The partitionable computer bus claim 3, wherein said circuitry for generating said open/close signal is operable to open and close said set of bus partitioning switches responsive to bus grant signals generated by said bus controller, said bus grant signals for communication to systems populating said first and second bus slots.

5. A partitionable computer bus, comprising:

a bus controller;

a set of bus partitioning switches, each operable to make and break connections between left and right terminals responsive to an open/close signal;

circuitry for generating said open/close signal;

first and second bus slots;

a first bus section coupling said bus controller to said first bus slot and to the left terminals of said set of bus partitioning switches; and a second bus section coupling the right terminals of said set of bus partitioning switches to said second bus slot;

wherein said set of bus partitioning switches comprises field-effect transistors, each having its gate coupled to said open/close signal.

6. A partitionable computer bus, comprising:

a bus controller having address/data signal nodes and control signal nodes;

first and second bus slots, each having address/data signal nodes and control signal nodes;

a set of address/data signal partitioning switches, said set of address/data signal partitioning switches having an address/data partition input, and each switch in said set of address/data signal partitioning switches operable to make and break connections between left and right terminals responsive to said address/data partition input;

a first set of control signal partitioning switches, said first set of control signal partitioning switches having a first control partition input, and each switch in said first set of control signal partitioning switches operable to make and break connections between left and right terminals responsive to said first control partition input; and a second set of control signal partitioning switches, said second set of control signal partitioning switches having a second control partition input, and each switch in said second set of control signal partitioning switches operable to make and break connections between left and right terminals responsive to said second control partition input; wherein:

the address/data signal nodes of said bus controller are coupled to the address/data signal nodes of said first bus slot and to the left terminals of said set of address/data signal partitioning switches;

the right terminals of said set of address/data signal partitioning switches are coupled to the address/data signal nodes of said second bus slot;

the control signal nodes of said bus controller are coupled to the left terminals of both of said first and second sets of control signal partitioning switches;

the right terminals of said first set of control signal partitioning switches are coupled to the control signal nodes of said first bus slot; and the right terminals of said second set of control signal partitioning switches are coupled to the control signal nodes of said second bus slot.

7. The computer bus of claim 6, wherein said first and second bus slots are operable to interface with first and second peripheral systems, respectively, said first peripheral system being capable of a faster data transfer rate than said second peripheral system.

8. The computer bus of claim 7, further comprising:
circuitry for generating an open/close signal; wherein said circuitry for generating an open/close signal is operable to place said open/close signal in a first state when bus traffic involves said first peripheral system, and to place said open/close signal in a second state when bus traffic involves said second peripheral system; and wherein said open/close signal is coupled to said address/data partition input and to said first and second control partition inputs in such a way that:
when said open/close signal is in said first state, the switches in said set of address/data signal partitioning switches and in said second set of control signal positioning switches are open, and the switches in said first set of control signal partitioning switches are closed; and
when said open/close signal is in said second state, the switches in said set of address/data signal partitioning switches and in said second set of control signal positioning switches are closed, and the switches in said first set of control signal partitioning switches are open.

9. The computer bus of claim 8, wherein said circuitry for generating an open/close signal determines which of said first and second peripheral systems is involved in bus traffic at least in part responsive to bus arbitration signals.

10. The computer bus of claim 9, wherein said circuitry for generating an open/close signal determines which of said first and second peripheral systems is involved in bus traffic at least in part responsive to bus grant signals generated by said bus controller.

11. A method of controlling a computer bus having first and second bus slots and operable with a bus controller at first and second data transfer rates, wherein said first and second data transfer rates are different rates, said method comprising the steps of:
a) when the computer bus is operating at the first data transfer rate, partitioning the computer bus so that the address/data pins of the bus controller are coupled to the address/data pins of both of the first and second bus slots, but so that the control pins of the bus controller are coupled only to the control pins of the second bus slot; and b) when the computer bus is operating at the second data transfer rate, partitioning the computer bus so that the address/data pins of the bus controller are coupled only to the address/data pins of the first bus slot, and so that the control pins of the bus controller are coupled only to the control pins of the first bus slot.

12. The method of claim 11, wherein the second data transfer rate is faster than the first data transfer rate.

13. The method of claim 11, wherein said step a) comprises the steps of:
a1) closing a first set of FET switches interposed in address/data lines extending between the first and second bus slots;
a2) closing a second set of FET switches interposed in control lines extending between the bus controller and the second bus slot; and
a3) opening a third set of FET switches interposed in control lines extending between the bus controller and the first bus slot.

14. The method of claim 11, wherein said step b) comprises the steps of:
b1) opening a first set of FET switches interposed in address/data lines extending between the first and second bus slots;
b2) opening a second set of FET switches interposed in control lines extending between the bus controller and the second bus slot; and
b3) closing a third set of FET switches interposed in control lines extending between the bus controller and the first bus slot.

15. The method of claim 11, further comprising the step of determining whether the next bus cycle will be performed at said first or at said second data transfer rate.

16. The method of claim 15, wherein said determining step is performed responsive to bus arbitration signals.

17. The method of claim 16, wherein said determining step is performed responsive to bus grant signals generated by said bus controller.

* * * * *